United States Patent
Besselmann (10) Patent No.: US 10,401,813 B2
(45) Date of Patent: Sep. 3, 2019

(54) ELECTRICAL DRIVE SYSTEM WITH MODEL PREDICTIVE CONTROL OF A MECHANICAL VARIABLE

(71) Applicant: ABB Schweiz AG, Baden (CH)

(72) Inventor: Thomas Besselmann, Birmenstorf (CH)

(73) Assignee: ABB Schweiz AG, Baden (CH)

( * ) Notice: Subject to any disclaimer, the term of this patent is extended or adjusted under 35 U.S.C. 154(b) by 448 days.

(21) Appl. No.: 14/940,766

(22) Filed: Nov. 13, 2015

(65) Prior Publication Data
US 2016/0070248 A1    Mar. 10, 2016

Related U.S. Application Data

(63) Continuation of application No. PCT/EP2014/057156, filed on Apr. 9, 2014.

(30) Foreign Application Priority Data

May 15, 2013  (EP) ..................... 13167822

(51) Int. Cl.
    *G05B 13/04*  (2006.01)
    *G05B 19/04*  (2006.01)

(52) U.S. Cl.
    CPC ........... *G05B 19/04* (2013.01); *G05B 13/048* (2013.01); *G05B 2219/23265* (2013.01)

(58) Field of Classification Search
    CPC ............... G05B 19/04; G05B 13/048; G05B 2219/23265
    See application file for complete search history.

(56) References Cited

U.S. PATENT DOCUMENTS

| | | | |
|---|---|---|---|
| 2006/0282177 A1 | 12/2006 | Fuller et al. | |
| 2008/0300827 A1* | 12/2008 | Lu ........................ | G01R 31/343 702/182 |
| 2011/0050146 A1* | 3/2011 | Okita ................... | G05B 19/404 318/631 |
| 2011/0125293 A1 | 5/2011 | Havlena | |
| 2012/0001582 A1* | 1/2012 | Park ..................... | G05B 13/048 318/610 |
| 2012/0059642 A1* | 3/2012 | Vollmer ............. | A63B 21/0004 703/13 |

OTHER PUBLICATIONS

European Search Report Application No. EP 13 16 7822 Completed: Oct. 31, 2013;dated Nov. 7, 2013 9 pages.

(Continued)

*Primary Examiner* — Cuong B Nguyen
*Assistant Examiner* — Samuel Park
(74) *Attorney, Agent, or Firm* — Whitmyer IP Group LLC (57) ABSTRACT

A system for controlling an electrical drive including the steps of: receiving an input reference value for a first mechanical variable; estimating a second mechanical variable for a predefined time based on a model based on: a first equation for predicting a future state of the drive system a second equation for predicting at least an actual value of the second mechanical variable; and selecting a first future value from development of the second mechanical variable.

12 Claims, 2 Drawing Sheets

(56) References Cited

OTHER PUBLICATIONS

International Search Report and Written Opinion of the International Searching Authority Application No. PCT/EP2014/057156 Completed: Jun. 23, 2015;dated Jun. 30, 2014 10 pages.

Marcin Cychowski, et al., "Constrained Model Predictive Control of the Drive System With Mechanical Elasticity", IEEE Transactions of Industrial Electronics, IEEE Service Center, Piscataway, NJ, USA, vol. 56, No. 6, Jun. 1, 2009, pp. 1963-1973.

Nils Hoffman, et al., "Model Based Predictive Speed Control of a Drive System with Torsional Loads—A Practical Approach", Power Electronics and Motion Control Conference (EPE/PEMC), 2010 14th International, IEEE, Piscataway, NJ, USA, Sep. 6, 2010, pp. T5-T149.

International Preliminary Report on Patentability & Written Opinion of the International Searching Authority Application No. PCT.EP2014/057156 Completed: Nov. 17, 2015;dated Nov. 25, 2015 7 pages.

\* cited by examiner

ELECTRICAL DRIVE SYSTEM WITH MODEL PREDICTIVE CONTROL OF A MECHANICAL VARIABLE

FIELD OF THE INVENTION

The invention relates to a method, a computer program, a computer-readable medium and a controller for controlling an electrical drive system. The invention also relates to an electrical drive system.

BACKGROUND OF THE INVENTION

Electrical drive systems with a variable speed may be used to run a machinery such as a pump, a fan or a compressor at different speeds. The machinery is usually connected via a shaft with the drive system. The machinery can consist of a single component or of multiple components along the drive shaft. The most common drive systems comprise a drive in the form of a variable speed AC or DC electric motor. Varying the speed of the machinery has several advantages compared to fixed-speed operation, the most prominent one being the ability to save energy by running the machinery at lower speeds.

During control of such a drive system, it is often assumed that the rotational speed is equal over the length of the drive shaft. Additionally, it is often assumed that the rotational speed derived from the electric signals of the electric drive is equal to the rotational speed of the machinery. Similarly, the torque at the air gap of the electric drive is assumed to equal the torque applied to the machinery.

These assumptions may be valid as long as the drive shaft has no distinct natural frequencies, or is run in a low dynamic fashion. The applications that have emerged in recent years however may have high dynamic demands such that those assumptions may not be valid and the dynamics of the drive shaft may have to be taken into account.

One example for such an application is the operation of compressor trains in the oil and gas industry, where electrical drive systems may replace commonly used gas turbines. In these applications, the drive shafts usually are long and relatively thin, resulting in a flexible, weakly damped structure with easily excitable natural frequencies. The commonly made assumption that the drive shaft is a single mass rotating with a certain speed may often not be valid in these applications. The torques and speeds at different points of the drive shaft may differ significantly from each other.

Furthermore, it may be a demand in these applications to control highly dynamic processes, in which the speed of or the torque applied to the machinery has to be varied according to the needs of the process. An example may be compressor station anti-surge control, where the torque applied to the compressor is varied to prevent surge events. These events may require immediate actions, and oscillations in the torque of the compressor may not be acceptable in the case of a surge event.

Additionally, in these control schemes, the controlled variables are preselected and cannot be changed. A selection of a different mechanical variable, such as the torque at the machinery, or a limitation of other variables, such as torsional strain at a coupling, is not part of the control scheme. However, the application of a drive may underlie different requirements in different industries. In one application, the angle of the machinery may be of importance, in the next the torque or the speed. These different situations are usually handled by applying different control schemes for different situations.

In "Model based predictive speed control of a drive system with torsional loads—a practical approach", Power Electronic and Motion Control Conference, 2010, IEEE 2010, a model based predictive speed control of a drive system is disclosed and takes into account the torsional oscillations of long driveshafts in an electro-mechanical drive arrangement characterized by fast dynamics. Therefore, it discloses a method for controlling an electrical drive system and the electrical drive system comprising a drive mechanically interconnected with a machinery for processing an industrial process.

Furthermore, US 2012/0059642 A1 discloses a device and a method for determining position information of the rotor shaft of an electric machine based on at least one recorded input signal of the electric machine. The recorded input signal being supplied to a model of the electric machine. The position information of the rotor shaft is determined with the aid of the model, based on the supplied input signal, the model mapping nonlinear saturation effects of the electric machine.

SUMMARY OF THE INVENTION

It is an object of the invention to provide an accurate and flexible control method for a drive system with variable speed.

This object is achieved by the subject-matter of the independent claims. Further exemplary embodiments are evident from the dependent claims and the following description.

An aspect of the invention relates to a method for controlling an electrical drive system. The electrical drive system may comprise a drive, such as an electrical motor or variable speed drive, which is mechanically interconnected with a machinery for processing an industrial process. The machinery or mechanical device may be one or multiple pumps, fans or compressors. The industrial process may be performed in an industrial plant, for example an oil refinery or chemical plant. The machinery and the drive may be interconnected by a drive shaft.

According to an embodiment of the invention, the method comprises the steps of: receiving an input reference value for a first mechanical variable of the electrical drive system, for example from a process control layer of the electrical drive system; estimating a development of output references for a second mechanical variable of the drive system for a predefined horizon of time steps from the input reference value based on a mathematical model of the drive system; and selecting a first future value from the development of the second mechanical variable as output reference value for the second mechanical variable to be output to a drive control layer adapted for controlling electrical inputs of the drive.

The method may be performed periodically, for example every time step, to consecutively calculate output reference values that are input to the drive control layer.

The first mechanical variable may be a variable relating to a mechanical component downstream of the drive, for example a part of the shaft remote from the air gap of the drive. The first mechanical variable may be a speed, a torque, an angle and/or any other mechanical variable at a specific location of the drive shaft.

The input reference value for the first mechanical variable may be provided by a process control layer, which determines the input reference values from process variables to be controlled like a flow rate or a pressure. It is possible that the process control layer may not only provide an actual input reference value for the first mechanical variable but a reference trajectory or development of the first mechanical variable. However, the input reference value also may be a (fixed) value that may be directly stored in the controller, which executes the method.

The first mechanical variable and/or the mathematical model may be selected manually (by a user) during an initialization phase of the drive system, before the method is performed automatically by a controller. The method may support a flexible selection of mechanical variables to be controlled. With the method it is possible to control user-specified mechanical variables at user-specified locations along the drive shaft.

The mathematical model may model the mechanical behavior of the drive system, i.e. the drive interconnected with the machinery and optionally the shaft. The second mechanical variable may be a variable relating directly to the drive, for example the torque or the speed of the drive at the air gap of the drive.

The method may be seen as a predictive control method employing a mathematical model of the drive system. The method may allow the control of the first mechanical variable such as the torque, angle or speed at any customer-chosen point of the drive shaft. With the method, potential oscillations stemming from the excitation of natural frequencies of the drive shaft may be predicted and mitigated.

The method may account for the dynamics of the drive shaft, and may control the first mechanical variable at a user-specified location along the drive shaft, for example at the location of the machinery. Instead of reacting to oscillations already present in the system, the method may take the dynamics and natural frequencies of the drive shaft into account to proactively prevent these frequencies from being excited in the first place. The predictive control approach may allow to predict those oscillations before they occur.

According to an embodiment of the invention, the method further comprises the step of: receiving measured and/or estimated input values for further mechanical and/or electrical variables of the drive system. The further input values may comprise measured and/or estimated values for the second mechanical variable, measured and/or estimated torques, speed or angles, and/or electrical currents and voltages of the drive.

The estimating of the development of output references for the second mechanical variable may be additionally based on the input values for the further mechanical and/or electrical variables. Not only the actual values (i.e. the values of the actual/current time step) may be used for estimating the development of the second mechanical variable but also past values (i.e. values of previous time steps). Past input values as well as the past input reference values of the first variable and/or past output reference values for the second mechanical variable may be stored in a controller, which performs the method.

According to an embodiment of the invention, the method further comprises the step of: estimating a current state of the drive system from at least past output reference values of the second mechanical variable based on the mathematical model of the drive system.

According to an embodiment of the invention, the method further comprises the step of: estimating a current state of the drive system from at least past input values for the first mechanical variable based on the mathematical model of the drive system.

The current state comprises at least one mechanical variable that is not measured in the drive system. The current state may be estimated by additionally taking into account past output reference values for the second mechanical variable and/or past measured and/or estimated input values.

In general, a state of the drive system may be a set of variables that may be used for calculating the next state of the drive system during the next time step and for calculating a value of the second mechanical variable at the same time step with the aid of a number of measured and/or estimated input values and the mathematical model.

According to an embodiment of the invention, the estimating of the current state is based on an extended Kalman filter. An extended Kalman filter may use local linearizations of the mathematical model and may execute simple state-estimate update equations at each time step, which may make it especially suited for a real-time environment, where computational speed may be critical.

According to an embodiment of the invention, the method further comprises the step of: linearizing the mathematical model based on a current state of the drive system during estimating the development of the output references for the second mechanical variable of the drive system. When the estimate for the current state has been calculated, the (eventually non-linear) equations of the mathematical model may be approximated by matrix equations.

According to an embodiment of the invention, the estimation of the development of the second mechanical variable is based on solving a quadratic problem (quadratic programming, QP) which minimizes differences between future values of the first mechanical variable and future reference values for the first mechanical variable. It has to be noted that the future reference values may be estimated from the (actual) input reference value, for example based on the mathematical model. It is also possible that the process control layer provides the future reference values up to the horizon of time steps.

According to an embodiment of the invention, the quadratic problem may comprise the (linearized) mathematical model as equality constraints. The quadratic problem also may comprise further constraints on the mechanical variables of the drive system, for example a maximal torque and/or a maximal speed at a specific component of the drive system. The constraints may be defined on other variables different from the first and second mechanical variable, for example to limit the oscillations of the torque or speed at other locations of the drive shaft. The constraints may also relate to electrical or magnetic variables of the electric drive, or process variables of the machinery.

According to an embodiment of the invention, the method further comprises the step of: receiving further dynamic objectives and/or dynamic constraints for the quadratic problem. The objectives and/or constraints may be constant, or may vary dynamically with the state of the electric drive and the process. These dynamic objectives and/or dynamic constraints may be received from other control layer, for example from a process control layer and/or a drive control layer.

According to an embodiment of the invention, the mathematical model is a non-linear model. The mathematical model may comprise a model of the closed drive control loop, the drive shaft dynamics and optionally the process to be controlled, in order to control the first mechanic variable, which may be located along the drive shaft of the system.

The mathematical model may comprise a two-mass, a multi-mass or non-linear model of the drive shaft. The mathematical model may take process dynamics or dynamics of the drive control layer into account.

The mathematical model is based on:

a first equation for predicting a future state of the drive system from an actual state and measured and/or estimated actual input values; and based on a second equation for predicting at least an actual value of the second mechanical variable from an actual state of the drive system and measured and/or estimated actual input values. These equations usually may be non-linear equations.

The second mechanical variable is a mechanical variable at the air gap of the drive of the drive system, for example at least one of a speed, a torque and an angle at the air gap. The air gap of the drive may be the location between the rotor and the stator of the electrical motor of the drive.

In general, a mechanical variable may be a mechanical quantity that is measureable at the respective location. However, in general, the variable is not measured but only estimated during the execution of the method. A mechanical variable may be a rotational speed, a torque, an angle or a difference of angles. A mechanical variable may also be a quantity relating or corresponding to a speed, torque, angle, strain, etc.

The first mechanical variable may be a mechanically variable of a component mechanically connected to the drive of the electrical drive system, for example at least one of a speed, a torque and an angle of the component. The first mechanical variable to be controlled by the method may be located somewhere along the drive shaft, but not at the air gap of the drive. The first mechanical variable may be located at the machinery. The component may be part of a shaft, which is mechanically connected to the drive. The component may be remote from the air gap of the drive.

A further aspect of the invention relates to a computer program, which, when being executed by a processor, is adapted for carrying out the steps of the method as described in the above and in the following. For example, the program may comprise a number of software routines and/or software modules that are executed in a processor of a controller of the drive system.

A further aspect of the invention relates to a computer-readable medium on which such a computer program is stored. A computer-readable medium may be a non-volatile medium like a floppy disk, a hard disk, an USB (Universal Serial Bus) storage device, a RAM (Random Access Memory), a ROM (Read Only Memory) and an EPROM (Erasable Programmable Read Only Memory). A computer-readable medium may also be a volatile medium like a data communication network, e.g. the Internet, which allows downloading a program code.

A further aspect of the invention relates to a controller for a drive which is adapted for carrying out the steps of the method as described in the above and in the following. For example, the controller may comprise a memory in which the above described computer program is stored and a processor for executing the program. The controller also may comprise an FPGA or DSP.

According to an embodiment of the invention, the controller comprises further cascaded control layers. The controller may comprise a process control layer adapted to control the industrial process that is performed by the drive system. The controller may comprise a mechanical variable control layer adapted to carry out the steps of the method as described in the above and in the following. The controller may comprise a drive control layer adapted for controlling electrical inputs of the drive.

The process control layer may be adapted to calculate the input reference value for the first mechanical variable to be input to the mechanical variable control layer. For example, the process control layer may have a pressure and/or a flow rate as input reference value and/or may have a torque of the shaft or the machinery as an output value, which is the input reference value of the mechanical variable control layer. The process control layer may further provide constraints to the mechanical variable control layer, based on the status of the process. It may be adapted to receive status information from the mechanical variable control layer.

The drive control layer may be adapted to process the output reference value of the second mechanical variable output by the mechanical variable control layer. For example, the output reference value may be an air gap torque of the drive and the drive control layer may generate switching states for an inverter generating the input current of the electrical motor of the drive. The drive control layer may further provide constraints to the mechanical variable control layer, based on the status of the electric drive. It may be adapted to receive status information from the mechanical variable control layer.

The mechanical variable control layer may comprise a model predictive variable-speed drive controller. The mechanical variable control layer may be seen as a replacement of a speed control layer by a control layer controlling a mechanic variable by means of a model predictive control approach.

A further aspect of the invention relates to a drive system, comprising a drive, a controller as described in the above and in the following and a machinery that is driven by the drive, for example via a drive shaft. The mathematical model of the controller may be adapted for predicting a mechanical behavior of the drive that is mechanically connected to the machinery.

It has to be understood that features of the method as described in the above and in the following may be features of the computer program, the controller and drive system as described in the above and in the following and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

In principle, identical parts are provided with the same reference symbols in the figures.

DETAILED DESCRIPTION OF THE INVENTION

Figure 1:
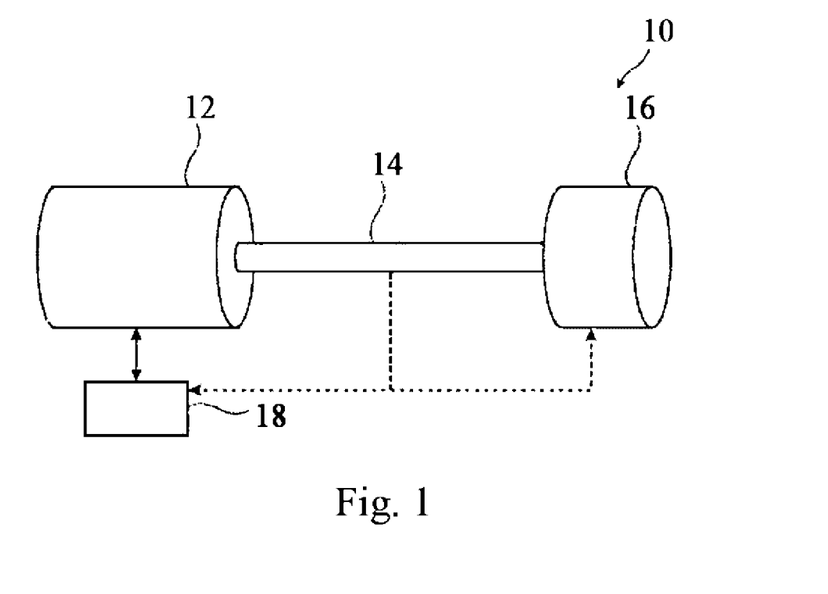
FIG. 1 schematically shows a drive system according to an embodiment of the invention.

FIG. 1 shows a drive system 10 comprising a drive 12 that is connected via a drive shaft 14 with some machinery 16 like a pump, fan or compressor.

The drive 12, which may comprise a high power AC or DC electrical motor together with its current converter, comprises a controller 18 that is adapted for measuring currents and voltages in the drive 12 and optionally further mechanical values/variables of the drive system 10, like, for example, a speed of the machinery 16. In this case, the controller 18 may comprise a speed sensor. Optionally controller 18 may receive further variables from the machinery 16 or other parts of the process, and/or may send further control signals to the process.

Figure 2:
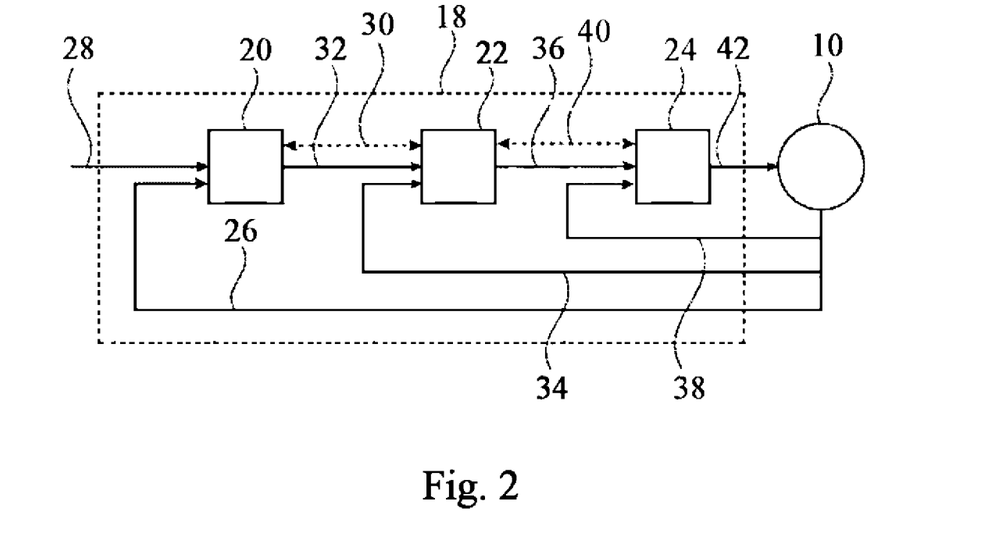
FIG. 2 schematically shows a controller of the drive system according to an embodiment of the invention.

FIG. 2 shows the controller 18 in more detail. The controller 18 comprises a cascade of different control layers, i.e. a process control layer 20, a mechanical variable control layer 22 and a drive control layer 24. The three control layers 20, 22, 24 establish three nested control loops, an inner drive control loop, a mechanical variable control loop and a process control loop.

The process control layer 20 controls process variables such as the pressure difference or the mass flow in a compressor station. The measured or estimated process variable 26 and a process reference value 28 are the input to the process control layer 20 or process controller 20, which computes a mechanical variable reference value 32 for the mechanical variable control loop. Optionally the process control layer 20 may return further control signals for the machinery 16 or other parts of the process.

The process control layer 20 may further provide constraints 30 to the mechanical variable control layer 22, based on the status of the process. The process control layer 20 may be adapted to receive status information from the mechanical variable control layer 22. The mechanical variable may be a torque or speed of the drive system 10 remote to the air gap of the drive, for example a torque or a speed at some point along the shaft 14.

The mechanical variable reference value 32 and measured and/or estimated input variables 34, which for example may comprise an air gap torque and/or an air gap speed, are input to the mechanical variable control layer 22 or mechanical variable controller 22, which computes a drive control reference 36 (for example an air gap torque reference) for the drive control loop. The mechanical variable control layer 22 will be explained in more detail with respect to FIGS. 3 and 4.

The drive control layer 24 may be an air gap torque control layer. For example, in the drive control loop, a measured or estimated air gap torque 38 and the air gap torque reference 36 are the input to the air gap torque control layer 24 or air gap torque controller 24 which computes the control inputs 42 to the drive system 10.

The drive control layer 24 may further provide constraints 40 to the mechanical variable control layer 22, based on the status of the electric drive 12. The drive control layer 24 may be adapted to receive status information from the mechanical variable control layer 22.

The controllers 20, 24 may be implemented as PI controllers. The single control layers 20, 22, 24 may be implemented by different people in different companies. The process control layer 20 usually may be designed by process engineers familiar with the process to be controlled, while the air gap torque and the mechanical variable control layer 22 usually may be designed by the provider of the drive 12.

Figure 3:
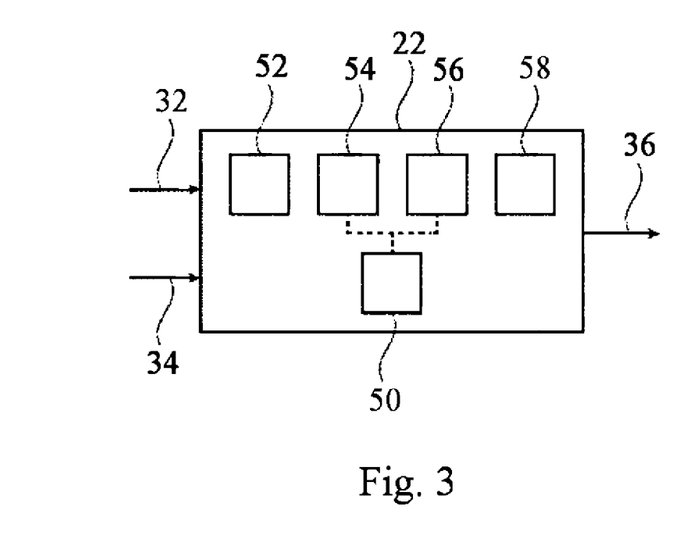
FIG. 3 schematically shows a mechanical variable controller according to an embodiment of the invention.

FIG. 3 shows the mechanical variable controller 22 in more detail. The controller 22 is based on a model predictive control scheme.

The controller 22 receives as input the measured or estimated actual input values 34 of the drive system 10 and the input reference value 32 for a user-specified first mechanical variable remote from the air gap of the drive 12, for example located along the shaft. The controller 22 comprises a model 50 of the drive system 10, which is used to compute an output reference value 36 of a second mechanical variable at the air gap, for example an air gap torque reference value 36 by means of a model-based predictive control approach.

In the controller 22, a mathematical/physical model 50 of the drive system 10 is implemented that is adapted for predicting the electrical and/or mechanical behavior (response) of the drive system 10 to changing input variables 34 and output reference variables 36. The controller furthermore comprises further software modules/routines 52, 54, 56, 58 that will be explained with respect to FIG. 4.

Before execution of the software routines with the controller 22 (as will be described with respect to FIG. 4), the controller 22 may be prepared by means of an initialization phase. In the initialization phase, the controller 22 is prepared for application to a specific drive system 10. The preparation, which may be performed by a service technician/user, may comprise two steps:

a) providing a mechanical model 50 of the drive system 10, and b) selecting the mechanical variable 32 to be controlled and optionally the objectives and/or constraints of the drive system 10.

The mechanical model 50 of the drive system 10 may be based on physical equations that reflect the mechanical properties of the drive system 10. In the second step b), the objectives and targets of the control scheme are determined.

Figure 4:
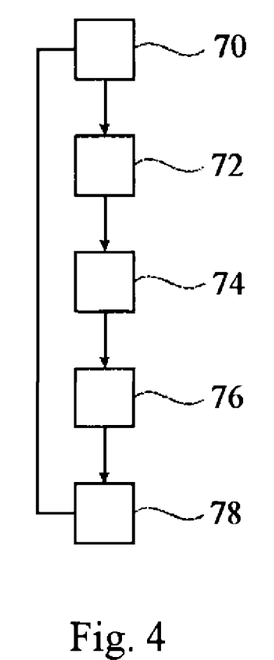
FIG. 4 shows a flow diagram for a method for controlling a drive system according to an embodiment of the invention.

FIG. 4 shows a possible embodiment of a control method that may be implemented in the controller 22. The described embodiment follows a linearized non-linear model predictive control approach.

The modules 50, 52, 54, 56, 58 may be implemented as a collection of software routines on a real-time estimating platform chosen for the control application. In general, the collection of software routines may include a non-linear mathematical model 50, a data collection and distribution application/module 52, a state estimator module 54, a model linearization module 56, a QP preparation and QP solver module 58. These software routines as well as the method steps shown in FIG. 4 may be executed periodically, preferably every 1 ms.

In step 70, the data collection module 52 performs data collection, the mechanical variable reference 32 is received from the process control layer 20 and other measured and estimated input values 34 are received from other components of the drive system 10. Optionally further signals may be received from the process control layer 20 and the drive control layer 24, for examples the constraints 30 and/or the constraints 40.

The mechanical variable reference(s) 32 (i.e. operating points) are determined by the process control layer 20 and may be given as setpoints. Those setpoints may comprise speed or torque at the machinery 16 or at other locations of the drive system 10.

The measured input values 34 may be collected via a data communication network from sensors of the drive system 10. The input values 34 usually comprise information such as air gap torque or rotational speed at the air gap.

In step 72, the current state estimation module 54 determines the current states of the drive system 10 which may not be available due to measurements, such as unmeasured speeds or torques at intermediate locations of the drive shaft 10.

An Extended Kalman Filter (EKF) can be used as state estimator 54. Such an estimator 54 is based on a mathematical model 50 of the drive system 10, which describes the dynamic behavior of the drive system 10 in discrete time steps. The model is typically stated in equations of the form $$x(k+1)=f(x(k),u(k)) \quad \text{(Eq. 1)}$$

$$y(k)=g(x(k),u(k)) \quad \text{(Eq. 2)}$$

where k represents the discrete time, x(k) represents the state of the drive system 10, x(k+1) represents the predicted future state of the drive system 10, y(k) represents the output reference values 36, and u(k) represents the known input variables 34. u(k) comprises the first mechanical variable. Therefore, Eq. 1 is the first equation for predicting a future state of the drive system 10 and Eq. 2 second equation for predicting at least an actual value of the second mechanical variable.

f usually is a non-linear function describing the dynamic behavior of the drive system 10. g usually is a non-linear function describing how the outputs depend on the states and input values of the drive system 10.

The state estimator module 54 is able to deduce an estimate $\xi(k)$ of the current state of the drive system 10 from the past measurements and/or past input values 34, using the mathematical model 50 (Eq. 1-2).

The extended Kalman filter may use local linearizations of f and g and may execute simple state-estimate update equations at each sampling instance/time step, which makes it especially suited for a real-time environment, where computational speed is critical.

It is important to note that the function f and g have to be known a-priori, and that they may be different for each configuration of drive system 10. Therefore, a modelling procedure may be executed before operation of the controller 22.

In the following two steps, a quadratic problem (QP) is formulated and solved. These steps involve the formulation of a constrained finite-time optimal control problem as a quadratic problem.

In step 74, the model linearization module 56 linearizes the non-linear mathematical model 50 (Eq. 1-2) around the estimated state $\xi(k)$ to obtain a linearized model.

$$\xi(k+1)=A_k\xi(k)+B_k u(k)+f_k \quad \text{(Eq. 3)}$$

$$\eta(k+1)=C_k\xi(k)+D_k u(k)+g_k \quad \text{(Eq. 4)}$$

The linearized model is then used to predict the states and outputs of the system over a finite-time horizon p, depending on the choice of the current and future control inputs.

The use of the linearized model (Eq. 3-4) allows one to solve a quadratic problem instead of a general non-linear optimization problem, for which fast open-source QP solvers exist. Alternatively, other methods may be employed to approximate the non-linear optimization problem by a QP. Modern state-of-the-art QP solvers are very fast, able to solve a QP of not too large dimensions in the range of ms.

For the formulation of the QP, the condensed input and state vector is defined:

$$z=[u(k), u(k+1), \ldots, u(k+p), \xi(k), \xi(k+1), \ldots \xi(k+p)].$$

The reference values 32 for the future states and inputs have been collected by the data collection module 52 and can be processed by means of the model 50 to derive $$r=[u_r(k), u_r(k+1), \ldots, u_r(k+p), \xi_r(k), \xi_r(k+1), \ldots, \xi_r(k+p)].$$

In step 76, quadratic problem solver module 58 solves the optimization problem, which using the above definitions may be stated as $$\min_z (z-r)^T Q(z-r)$$

subject to $$H_{in} z \leq k_{in}$$

$$H_{eq} z = k_{eq} \quad \text{(Eq. 5)}$$

The quadratic objective function (the argument in $\min_z$) penalizes the distance of the predicted states and inputs z from the reference r, where Q is a positive semidefinite quadratic weight matrix used to tune the controller 22. The linearized model equations (Eq. 3-4) are incorporated into the quadratic problem by means of the equality constraints $H_{eq} z = k_{eq}$. $H_{eq}$ and $k_{eq}$ represent the state-update equations over the whole prediction horizon in a condensed form. Physical and/or desired limitations on the states and inputs may be incorporated via the inequality constraints given by $H_{in}$ and $k_{in}$.

The optimization variable z includes the predicted states $\xi(k+1), \ldots, \xi(k+p)$, while those variables could be substituted by their dependencies from the current state estimate $\xi(k)$, and the predicted inputs $u(k), \ldots, u(k+p)$, leading to an optimization problem of reduced size. In the present formulation, the predicted system states are also considered as an optimization variable and thus the amount of computations for constructing the condensed matrices is reduced at the cost of having to solve a larger optimization problem.

Another formulation may also be derived for the measurable outputs y(k). Also quadratic cost and polyhedral constraints on the output may be reformulated to derive a quadratic problem of the form shown in (Eq. 5).

Many variations and extensions of the model predictive control (MPC) formulation described above exist, for example soft constraints to avoid non-feasibilities of the optimization problem, move blocking and multiplex MPC to reduce the size of the optimization problem to name but a few.

Instead of providing setpoints for the control input values 34, it is possible to use the so-called $\delta u$-formulation, and minimize the difference between succeeding control inputs instead of their distance to a given steady-state value.

Summarized, a linearization is executed to derive a linearized model of the form (Eq. 3-4), then the derived matrices $A_k$, $B_k$, $C_k$, $D_k$ and the vectors $f_k$, $g_k$ are integrated into the QP formulation (Eq. 5) and finally the quadratic problem is solved.

In step 78, the solution for the current time step is implemented. From the solution of the quadratic problem $z_{opt}(k)$, only the current control input $u_{opt}(k)$ at the current time step k is used. The value of the second mechanical variable at the current time step is distributed as reference value 36 to the drive control layer 24 using the data collection and distribution module 52.

At the next sampling instance/time step, the steps 70 to 78 are repeated starting with step 70.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for controlling an electrical drive system, the electrical drive system comprising a drive mechanically interconnected via a shaft with a machinery for processing an industrial process, the method comprising the steps of:
measuring process control variables of the industrial process and determining an input reference value for a first mechanical variable of the electrical drive system from the process control variables with a process control layer, whereby the first mechanical variable is a mechanical variable of a component mechanically connected to the drive of the electrical drive system, the component being arranged downstream of the drive;
estimating a development of an output reference for a second mechanical variable of the electrical drive system for a predefined horizon of time steps from the input reference value of the first mechanical variable based on a mathematical model of the electrical drive system with a mechanical variable control layer, whereby the second mechanical variable is a mechanical variable of a component of the electric drive system which is different from the component associated with the first mechanical variable, whereby the second mechanical variable is a mechanical variable at an air gap of the drive of the electrical drive system, whereby the mathematical model predicts a mechanical behavior of the electrical drive system and whereby the mathematical model is based on:
a first equation for predicting a future state of the electrical drive system from an actual state and measured and/or estimated actual input values and based on
a second equation for predicting at least an actual value of the second mechanical variable from an actual state of the electrical drive system and measured and/or estimated actual input values;
selecting a first future value from the development of the second mechanical variable as output reference value for the second mechanical variable to be output to a drive control layer; and
controlling electrical inputs of the drive with the drive control layer by processing the output reference value for the second mechanical variable, which is a speed, a torque, an angle, or a difference of angles at the air gap of the drive, to generate switching states for an inverter or a converter providing input current to the drive.

2. The method of claim 1, further comprising the step of:
receiving measured and/or estimated input values for further mechanical and/or electrical variables of the electrical drive system;
wherein the estimating of the development of the output reference for the second mechanical variable is also based on the input values for further mechanical and/or electrical variables.

3. The method of claim 1, further comprising the step of:
estimating a current state of the electrical drive system from at least past output reference values of the second mechanical variable based on the mathematical model of the electrical drive system.

4. The method of claim 1, further comprising the step of:
estimating a current state of the electrical drive system from at least past input values based on the mathematical model of the electrical drive system.

5. The method of claim 3,
wherein estimating of the current state is based on an extended Kalman filter.

6. The method of claim 1,
wherein the estimating of the development of the output reference of the second mechanical variable is based on solving a quadratic problem which minimizes differences between future values of the first mechanical variable and future reference values for the first mechanical variable.

7. The method of claim 6, further comprising the step of:
receiving further dynamic objectives and/or dynamics constraints for the quadratic problem.

8. A computer program, which is executable in an electrical drive system, the electrical drive system having a drive mechanically interconnected via a shaft with a machinery for processing an industrial process, and when being executed by a processor in the electrical drive system, carries out the steps of:
measuring process control variables of the industrial process and determining an input reference value for a first mechanical variable of the electrical drive system from the process control variables with a process control layer, whereby the first mechanical variable is a mechanical variable of a component mechanically connected to the drive of the electrical drive system, the component being arranged downstream of the drive;
estimating a development of an output reference for a second mechanical variable of the electrical drive system for a predefined horizon of time steps from the input reference value of the first mechanical variable based on a mathematical model of the electrical drive system with a mechanical variable control layer, whereby the second mechanical variable is a mechanical variable of a component of the electric drive system which is different from the component associated with the first mechanical variable, whereby the second mechanical variable is a mechanical variable at an air gap of the drive of the electrical drive system, whereby the mathematical model predicts a mechanical behavior of the electrical drive system and whereby the mathematical model is based on:
a first equation for predicting a future state of the electrical drive system from an actual state and measured and/or estimated actual input values and based on
a second equation for predicting at least an actual value of the second mechanical variable from an actual state of the electrical drive system and measured and/or estimated actual input values;
selecting a first future value from the development of the second mechanical variable as output reference value for the second mechanical variable to be output to a drive control layer; and
controlling electrical inputs of the drive with the drive control layer by processing the output reference value for the second mechanical variable, which is a speed, a torque, an angle, or a difference of angles at the air gap of the drive, to generate switching states for an inverter or a converter providing input current to the drive.

9. A non-transitory computer-readable medium storing a computer program, which is executable in an electrical drive system, the electrical drive system having a drive mechanically interconnected via a shaft with a machinery for processing an industrial process, the computer program when executed performs the following steps:
measuring process control variables of the industrial process and determining an input reference value for a first mechanical variable of the electrical drive system from the process control variables with a process control layer, whereby the first mechanical variable is a mechanical variable of a component mechanically connected to the drive of the electrical drive system, the component being arranged downstream of the drive;

estimating a development of an output reference for a second mechanical variable of the electrical drive system for a predefined horizon of time steps from the input reference value of the first mechanical variable based on a mathematical model of the electrical drive system with a mechanical variable control layer, whereby the second mechanical variable is a mechanical variable of a component of the electric drive system which is different from the component associated with the first mechanical variable, whereby the second mechanical variable is a mechanical variable at an air gap of the drive of the electrical drive system, whereby the mathematical model predicts a mechanical behavior of the electrical drive system and whereby the mathematical model is based on:

a first equation for predicting a future state of the electrical drive system from an actual state and measured and/or estimated actual input values and based on a second equation for predicting at least an actual value of the second mechanical variable from an actual state of the electrical drive system and measured and/or estimated actual input values;

selecting a first future value from the development of the second mechanical variable as output reference value for the second mechanical variable to be output to a drive control layer; and controlling electrical inputs of the drive with the drive control layer by processing the output reference value for the second mechanical variable, which is a speed, a torque, an angle, or a difference of angles at the air gap of the drive, to generate switching states for an inverter or a converter providing input current to the drive.

10. A controller for a drive mechanically interconnected via a shaft with a machinery for processing an industrial process, the controller carrying out the steps of:

measuring process control variables of the industrial process and determining an input reference value for a first mechanical variable of an electrical drive system from the process control variables with a process control layer, the electrical drive system comprising the drive mechanically interconnected with the machinery, whereby the first mechanical variable is a mechanical variable of a component mechanically connected to the drive of the electrical drive system, the component being arranged downstream of the drive;

estimating a development of an output reference for a second mechanical variable of the electrical drive system for a predefined horizon of time steps from the input reference value of the first mechanical variable based on a mathematical model of the electrical drive system with a mechanical variable control layer, whereby the second mechanical variable is a mechanical variable of a component of the electric drive system which is different from the component associated with the first mechanical variable, whereby the second mechanical variable is a mechanical variable at an air gap of the drive of the electrical drive system, whereby the mathematical model predicts a mechanical behavior of the electrical drive system and whereby the mathematical model is based on:

a first equation for predicting a future state of the electrical drive system from an actual state and measured and/or estimated actual input values and based on a second equation for predicting at least an actual value of the second mechanical variable from an actual state of the electrical drive system and measured and/or estimated actual input values;

selecting a first future value from the development of the second mechanical variable as output reference value for the second mechanical variable to be output to a drive control layer; and controlling electrical inputs of the drive with the drive control layer by processing the output reference value for the second mechanical variable, which is a speed, a torque, an angle, or a difference of angles at the air gap of the drive, to generate switching states for an inverter or a converter providing input current to the drive.

11. The controller of claim 10, further comprising:

the process control layer controlling an industrial process that is performed by the electrical drive system comprising the drive and a machinery mechanically connected to the drive;

the mechanical variable control layer, wherein the process control layer calculates the input reference value to be input to the mechanical variable control layer;

the drive control layer controlling electrical inputs of the drive, wherein the drive control layer processes the output reference value of the second mechanical variable output by the mechanical variable control layer;

wherein the process control layer carries out the steps of:

measuring process control variables and determining an input reference value for a first mechanical variable of the electrical drive system from the process control variables, whereby the first mechanical variable is a mechanical variable of a component mechanically connected to the drive of the electrical drive system, the component being arranged downstream of the drive;

wherein the mechanical variable control layer carries out the steps of:

estimating a development of an output reference for a second mechanical variable of the electrical drive system for a predefined horizon of time steps from the input reference value of the first mechanical variable based on a mathematical model of the electrical drive system, whereby the second mechanical variable is a mechanical variable at an air gap of the drive of the electrical drive system, whereby the mathematical model predicts a mechanical behavior of the electrical drive system and whereby the mathematical model is based on:

a first equation for predicting a future state of the electrical drive system from an actual state and measured and/or estimated actual input values and based on a second equation for predicting at least an actual value of the second mechanical variable from an actual state of the electrical drive system and measured and/or estimated actual input values;

selecting a first future value from the development of the second mechanical variable as output reference value for the second mechanical variable to be output to the drive control layer.

12. An electrical drive system for an industrial process, comprising:

a drive;

a machinery that is driven by the drive via a shaft;

a controller carrying out the steps of:
measuring process control variables of the industrial process and determining an input reference value for a first mechanical variable of the electrical drive system from the process control variables with a process control layer, whereby the first mechanical variable is a mechanical variable of a component mechanically connected to the drive of the electrical drive system, the component being arranged downstream of the drive;
estimating a development of an output reference for a second mechanical variable of the electrical drive system for a predefined horizon of time steps from the input reference value of the first mechanical variable based on a mathematical model of the electrical drive system with a mechanical variable control layer, whereby the second mechanical variable is a mechanical variable of a component of the electric drive system which is different from the component associated with the first mechanical variable, whereby the second mechanical variable is a mechanical variable at an air gap of the drive of the electrical drive system, whereby the mathematical model predicts a mechanical behavior of the electrical drive system and whereby the mathematical model is based on:
a first equation for predicting a future state of the electrical drive system from an actual state and measured and/or estimated actual input values and based on
a second equation for predicting at least an actual value of the second mechanical variable from an actual state of the electrical drive system and measured and/or estimated actual input values;
selecting a first future value from the development of the second mechanical variable as output reference value for the second mechanical variable to be output to a drive control layer; and
controlling electrical inputs of the drive with a drive control layer by processing the output reference value for the second mechanical variable, which is a speed, a torque, an angle, or a difference of angles at the air gap of the drive, to generate switching states for an inverter or a converter providing input current to the drive.

* * * * *